Figure 1:
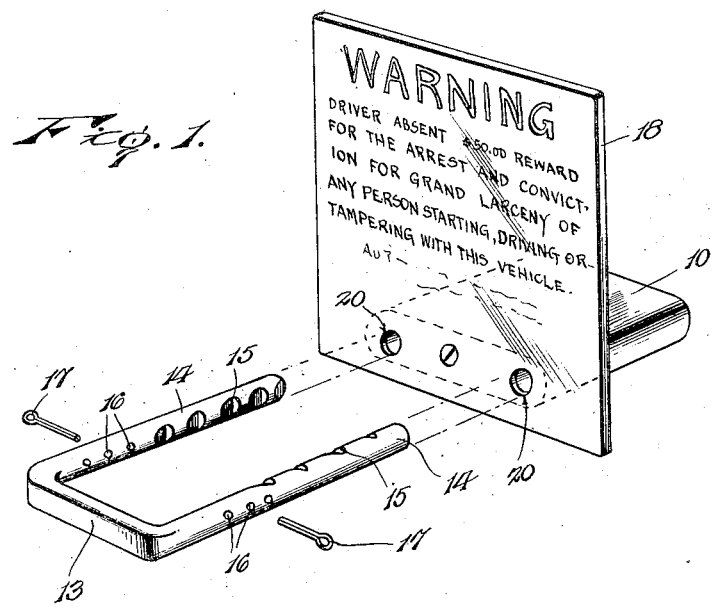

Mar. 27, 1923.

L. R. ZEPKA.
THEFT SIGNAL.
FILED JULY 14, 1922.

1,449,965.

Inventor

L. R. Zepka.

By Lacey & Lacey, Attorneys

Patented Mar. 27, 1923.

1,449,965

UNITED STATES PATENT OFFICE.

LUDWIG R. ZEPKA, OF CLEVELAND, OHIO.

THEFT SIGNAL.

Application filed July 14, 1922. Serial No. 575,003.

*To all whom it may concern:*

Be it known that I, LUDWIG R. ZEPKA, a citizen of the United States, residing at Cleveland, in the county of Cuyahoga, and State of Ohio, have invented certain new and useful Improvements in Theft Signals, of which the following is a specification.

This invention relates to an improved theft signal for motor vehicles and seeks, as one of its principal objects, to provide a simple and inexpensive device of this character for displaying upon a vehicle wind shield a warning indicating that the starting, driving or tampering with the vehicle in the absence of the rightful operator thereof, is unauthorized.

The invention has as a further object to provide a device of this character embodying a padlock which will be employed for mounting the signal plate of the device and securing said plate in display position upon the vehicle wind shield.

And the invention has as a still further object to provide a device which may be readily applied and which will be adapted for a wide range of use.

Other and incidental objects will appear hereinafter.

Figure 2:
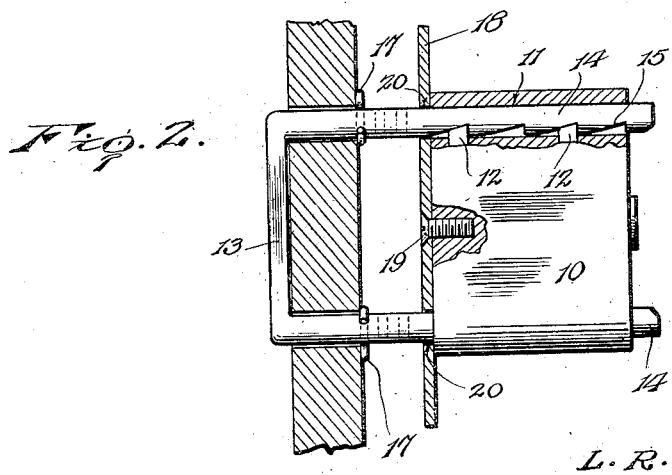

In the drawing:

Figure 1 is a perspective view of my improved theft signal showing the device in connection with a vehicle wind shield, and Figure 2 is a fragmentary horizontal sectional view more particularly showing the structural details of the device.

In carrying the invention into effect, I employ a padlock embodying a lock case 10 having spaced openings 11 therethrough and housing appropriate lock mechanism including spaced spring pressed latch bolts 12 normally projecting into one of said openings. In conjunction with the lock case I provide a substantially U-shaped shackle 13 having spaced arms 14 adapted to freely fit in the openings 11 of the case and formed in said arms at their inner sides are notches 15. These arms are each provided near their inner ends with a series of longitudinally spaced openings 16 through which may be selectively engaged cotter pins 17. I further provide, in conjunction with the lock case, a signal plate 18. This signal plate is detachably secured to the inner end of the lock case by a screw 19 or the like and formed in the lower margin of the plate are spaced openings 20 registering with the openings of the case. Suitably imposed upon the signal plate at its forward side is a warning inscription indicating that, in the absence of the owner or rightful operator of a vehicle, the starting, driving, or tampering with the vehicle is unauthorized.

As previously intimated, the device is, in use, mounted on a vehicle wind shield, the usual handle upon the lower rail of the wind shield being first removed when, as shown in the drawing, the arms 14 of the shackle 13 are projected through the bolt holes in said rail thus vacated to extend at the rear of the wind shield. The cotter pins 17 are then each engaged through one of the openings 16 of the arms 15 respectively, as shown in Figure 2, for securing the shackle upon the wind shield, it being observed in this connection, that by providing the arms with a plurality of the openings, provision is made whereby the device may be readily attached to wind shield rails of different thicknesses. As will thus now be seen, the lock case 10 may, when desired, be applied to the rearwardly projecting end portions of the arms of the shackle for supporting the signal plate 18 to upstand at the rear of the wind shield where the warning upon said plate may be readily viewed, the shackle arms extending through the openings 20 of the plate. Consequently, said plate cannot be individually removed while, of course, the catch bolts 12 will engage in the notches of the adjacent arm of the shackle for locking the case against removal. However, by inserting a proper key in the lock and retracting the catch bolts, the lock case may be easily displaced so that when it is not desired to display the signal, the lock case may removed and turned side for side to be again engaged with the arms of the shackle for supporting the signal plate in inverted inactive position, the catch bolts then engaging in the notches of the other of the arms of the shackle locking the case against displacement. In any instance where the proximity of the instrument board or other part of the vehicle would render it impossible to reverse the lock case with the signal plate thereon, the screw 19 may be eliminated so that the signal plate may be individually removed.

Having thus described the invention, what is claimed as new is:

1. In a theft signal for motor vehicles, the combination with a padlock including a shackle, and a lock case detachably engaged with the shackle, of a signal plate removably held upon the shackle by said case.

2. In a theft signal for motor vehicles, the combination with a padlock including a shackle, and a lock case detachably engaged with the shackle, of a signal plate mounted upon the lock case normally supported thereby for display.

3. In a theft signal for motor vehicles, the combination with a padlock including a shackle, and a lock case detachably engaged with the shackle, of a signal plate mounted upon the lock case normally supported thereby for display, the lock case being reversible side for side upon the shackle to dispose the signal plate in inactive position.

4. In a theft signal for motor vehicles, the combination with a padlock including a shackle, and a lock case detachably engaged with the shackle, of a signal plate removably mounted upon the lock case and formed to receive the shackle therethrough into the case.

5. In a theft signal for motor vehicles, the combination with a padlock including a shackle having arms engageable through a wind shield rail, means adjustably engageable with the arms securing the shackle upon the rail, and a lock case detachably engaged with said arms, of a signal plate removably held upon the shackle by said case.

In testimony whereof I affix my signature.

LUDWIG R. ZEPKA. [L. S.]